United State
Pankratz et al.

[11] 3,765,747
[45] Oct. 16, 1973

[54] LIQUID CRYSTAL DISPLAY USING A MOAT, INTEGRAL DRIVER CIRCUIT AND ELECTRODES FORMED WITHIN A SEMICONDUCTOR SUBSTRATE

[75] Inventors: John M. Pankratz; Kenneth E. Bean, both of Richardson, Tex.

[73] Assignee: Texas Instruments Incorporated, Dallas, Tex.

[22] Filed: Aug. 2, 1971

[21] Appl. No.: 168,425

[52] U.S. Cl. ........ 350/160 LC, 148/1.5, 317/235 R, 317/235 D, 350/160 R
[51] Int. Cl. ............................................. G02f 1/34
[58] Field of Search ............... 350/160 LC, 160 R; 317/235 AS, 235 F

[56] References Cited
UNITED STATES PATENTS

| | | | |
|---|---|---|---|
| 3,668,861 | 6/1972 | Mitsui | 350/160 LC |
| 3,655,270 | 4/1972 | Creagh | 350/160 LC |
| 3,499,702 | 3/1970 | Goldmacher et al. | 350/160 LC |
| 3,486,892 | 12/1969 | Rosvold | 317/235 AS |
| 3,476,592 | 11/1969 | Berkenblit et al. | 317/235 AS |
| 3,513,022 | 5/1970 | Casterline et al. | 317/235 F |
| 3,505,804 | 4/1970 | Hofstein | 350/160 LC |
| 3,674,341 | 7/1972 | Hedman, Jr. et al. | 350/160 LC |
| 3,500,140 | 3/1970 | Makimoto et al. | 317/235 |
| 3,442,011 | 5/1969 | Strieter | 317/235 F |

*Primary Examiner*—David Schonberg
*Assistant Examiner*—V. P. McGraw
*Attorney*—James O. Dixon et al.

[57] ABSTRACT

A liquid crystal display device having at least one of the electrodes formed within a semiconductor substrate is provided. Driver circuitry is integral with the substrate and may be formed either on the front or back side thereof. Very accurate spacing of the electrodes for the liquid crystal display is provided by forming a moat in the semiconductor substrate using an orientation dependent etch, the depth of the moat determining the electrode spacing.

23 Claims, 24 Drawing Figures

INVENTORS
Kenneth E. Bean
John M. Pankratz

BY
ATTORNEY

LIQUID CRYSTAL DISPLAY USING A MOAT, INTEGRAL DRIVER CIRCUIT AND ELECTRODES FORMED WITHIN A SEMICONDUCTOR SUBSTRATE

SUMMARY OF THE INVENTION AND BACKGROUND INFORMATION

This invention relates to displays and more particularly to liquid crystal displays in which at least one of the electrodes is formed within a semiconductor substrate.

Basically, liquid crystal compositions are materials which exhibit reversible optical properties when subjected to an electric field. Normally the compositions are transparent to light, but in the presence of an electric field they scatter incident light. This reversible alternation of the optical characteristics is generally thought to be a function of the alignment of the molecules and has been characterized as "dynamic scattering." This term will be used hereinafter to refer generally to the phenomenon of modulation of the transmissivity of liquid crystal compositions in response to an applied electric field. This characteristic has been extensively discussed in literature and for reasons for simplifying this disclosure will not be discussed in detail here. Further, exemplary liquid crystal compositions that are responsive to either d.c. or a.c. excitation voltages are well known. By way of example, the liquid crystal compositions identified in copending application, Ser. No. 148,759 filed June 1, 1971 now U.S. Pat. 3,655,270 issued Apr. 11, 1972, may be utilized in the display of the present invention.

The disclosed display system is described in optical terms, but may be used in any portion of the electromagnetic radiation spectrum in which the transmissivity or optical characteristics of the liquid crystal composition are reversibly changed under the influence of an electric field.

Liquid crystal displays are known to operate in at least two basic modes, namely the reflective and transparent modes. The displays which are the subject of this invention are adaptable to either mode of operation. A reflective mode liquid crystal display device consists of a transparent electrode spaced from a relative electrode with the space between the two electrodes being filled by a liquid crystal composition. When an electrical bias is placed across these two electrodes the composition is subjected to an electric field which causes it to change its optical characteristics. This causes the contrast of the viewing plane formed by the reflective electrode to change in the region adjacent the portions of the liquid crystal composition which are subjected to the electric field. By shaping at least one of the electrodes to conform to the pattern or a portion of the pattern to be displayed the desired display pattern can be formed.

A transparent mode liquid crystal device consists of two transparent electrodes and a liquid crystal composition positioned therebetween. A light source is placed behind the liquid crystal display and selected regions of the composition are subjected to the influence of an electric field by applying an electric potential between the electrodes. The electric field causes the liquid crystal composition to scatter light. By shaping at least one of the electrodes to conform to a pattern or a portion of the pattern to be displayed the desired pattern can be formed.

At this juncture it is noted that semiconductor substrates such as silicon are substantially transparent to radiation in many portions of the electromagnetic radiation spectrum in which the transmissivity of the liquid crystal composition may be reversibly changed. Thqs is true, for example, This respect to infrared radiation. Also, a silicon substrate may be thinned sufficiently such that it is substantially optically transmissive. In such cases it may be desirable to support the substrate on a transparent body such as glass.

Since, as described above, the pattern displayed is determined by the shape of an electrode, a liquid crystal display can be tailored to the desired application. Typical displays include the well-known seven segmented display used for displaying numbers between zero and nine as well as the dot display in which the pattern to be displayed is formed on a series of selectably placed dots. The dot type display may be formed by designing both the front and back electrodes of the liquid crystal display to have closely spaced but electrically insulated conductors, and orienting the front and back electrodes so that the respective conductors are orthogonal. The dot is formed by applying about one-half the voltage required to cause the liquid crystal composition to scatter light to each of the electrodes. A dot is formed in the region where the two electrodes cross.

One of the major problems associated with both transparent and reflective mode displays pertains to the thickness of the liquid crystal composition across the display. It is important that this thickness be uniform across the display in order to obtain desired optical characteristics. With thicknesses required on the order of 0.25 mils it is extremely difficult to fabricate a liquid crystal display having desired uniformity. Using orientation dependent etch techniques, however, a cavity for the liquid crystal composition may be formed, which cavity is extremely uniform in depth.

One embodiment of the invention provides a liquid crystal display in which the liquid crystal composition is positioned in a small moat formed in a semiconductor substrate by orientation dependent etch. One set of the electrodes for the display is formed in the bottom of the moat. The electrodes can be formed, e.g., by either diffusing impurities into the substrate or by ion implantation. The semiconductor material is highly reflective and in many cases may be sufficient alone for use in reflective mode applications. In some cases, however, it may be desirable to form a coating of a highly reflective metal over the electrodes to enhance the optical characteristics of the display. A second substantially transparent electrode is positioned over the moat and secured to the substrate. The moat is then filled with the liquid crystal composition such that it contacts both of the two electrodes. Orientation dependent etches are well in the semiconductor art. A suitable process is described in Bean et al., "The Influence of Crystal Orientation on Silicon Semiconductor Processing, " *PROCEEDINGS OF THE IEEE*, Vol. 57, No. 9, Sept. 1969, and references cited therein. Preferably the moat is etched in either the (110) or (100) face of a silicon substrate.

The conductors forming the electrodes which are positioned in the moat can be interconnected with bonding pads to provide a means for applying a bias voltage to the circuit. The interconnects may, e.g., comprise diffused conductors or metal conductors and may be formed using conventional integrated circuit metalization technology. The conductors can be insulated from the liquid crystal composition by forming a thin insulating layer on top of the conductor or in the case of diffused conductors by forming the conductors such that they do not extend to the surface of the substrate.

A second embodiment of the invention provides a liquid crystal display which includes driver circuitry integral with the semiconductor substrate. The driver circuitry can be formed in the surface of the substrate in which the display electrodes are formed or it may be placed on the opposite or back side of the substrate. In either case the basic driver circuitry may be formed using conventional integrated circuit technology and may be interconnected with the display electrodes using either conventional metalization or diffused paths. The driver circuitry can also include a diode in series with each of the display elements thereby permitting the display to be addressed in the so-called "scan mode."

Methods for forming the display electrodes in the moat and for forming interconnect paths connecting into these moats such that the interconnect path is shielded from the liquid crystal composition by a semiconducting layer are also disclosed. A method for forming connections to the display electrodes by etching moats in the back side of a slice of semiconductor material to expose the display electrodes are also disclosed. The exposed electrodes can be interconnected with driver circuitry or terminal pads using conventional metalization or diffused conductors.

This invention advantageously solves many of the problems associated with liquid crystal display devices. Among the advantages is a structure in which the electrode spacing of the liquid crystal display can be very small and very accurately controlled. This accurate control is provided by the orientation dependent etch moat in the substrate wherein the depth of the moat determines the electrode spacing. The depth of the moat can be very accurately controlled and as a result the characteristics of the display can be more accurately controlled. The integral driver circuits reduce the number of leads necessary to interconnect the display device with other systems. This improves reliability and makes the display device useable in applications where it previously could not be used because of the large number of leads required.

An object of the invention is to provide a liquid crystal display having close and accurately spaced electrodes.

Another object of the invention is to provide a liquid crystal display system in which one of the electrodes can be formed within a semiconductor substrate.

Another object of the invention is to provide a liquid crystal display system which includes drive circuits and display electrodes integral on the same substrate.

DESCRIPTION OF THE DRAWINGS

FIG. 21 a is a top view of a substrate employed in a test display constructed in accordance with the present invention.

FIG. 21b is a cross-section view of a test display constructed in accordance with the present invention employing the substrate of FIG. 21a.

DETAILED DESCRIPTION

Figure 1:
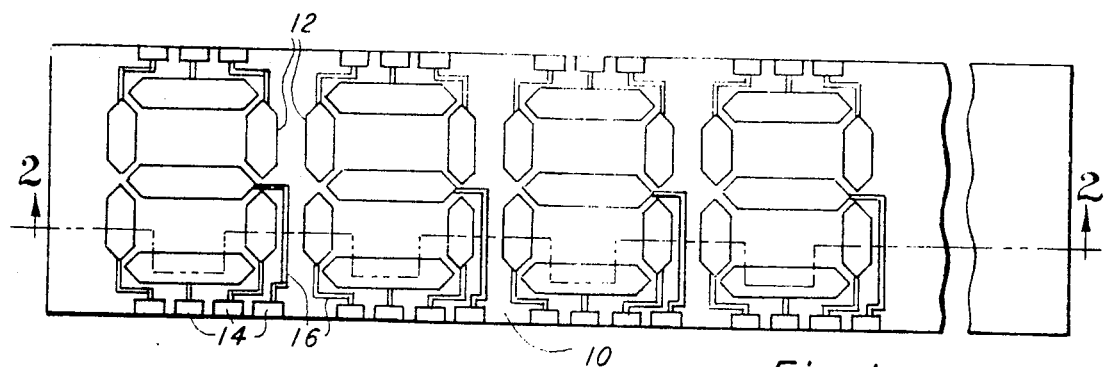
FIG. 1 is a top view of a semiconductor substrate which includes a plurality of display electrodes formed therein.

FIG. 1 illustrates in top plan view a substrate 10 suitable for use in one embodiment of the invention. The substrate 10 includes a plurality of electrodes 12 arranged in a pattern to form a segmented display capable of displaying the numbers zero through nine. The elements or electrodes 12 are respectively connected by conductors 16 to terminal pads 14 which are preferably positioned around the peripheral edge of the substrate.

Figure 2:
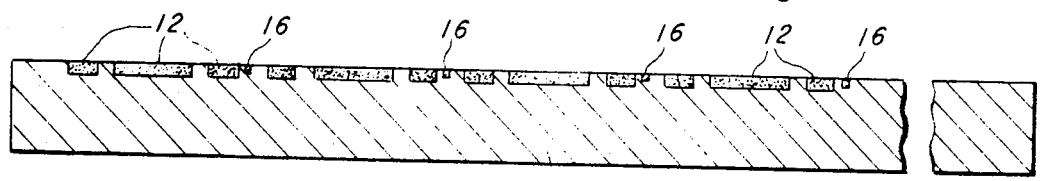
FIG. 2 is a cross-section view of the substrate of FIG. 1 taken along line 2—2.

The substrate 10 of FIG. 1 is illustrated in cross-section in FIG. 2. The display electrodes 12 in the substrate may be formed by diffusing appropriate inpurities into the upper surface of the substrate 10 to form low resistance regions. Conductors 16 which interconnect the electrodes 12 with the bonding pads 14 may also be formed in a similar manner. Diffusion apparatus and techniques are well known in the semiconductor art and need not be explained in detail herein.

Figure 3:
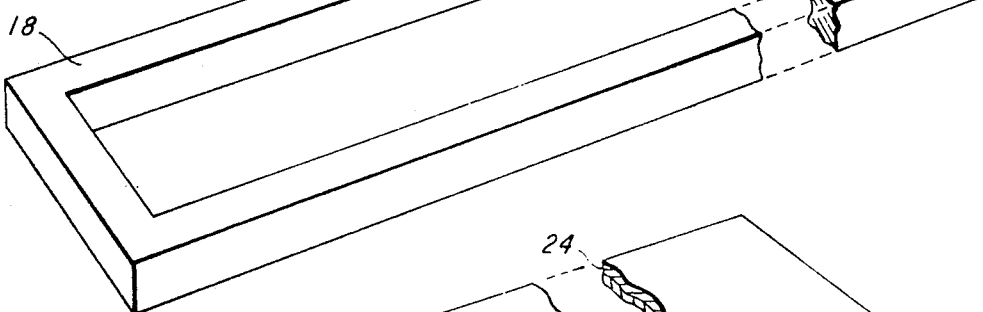
FIG. 3 is a pictorial view of a spacer for a liquid crystal display device.

FIG. 3 illustrates a spacer 18 suitable for use in combination with the substrate 10 to form a liquid crystal display system. The spacer 18 has an opening in the center such that all of the electrodes 12 remain exposed when the spacer 18 is positioned on the upper surface of the substrate 10. As will be explained hereinafter the spacer 18 encloses a liquid crystal composition. The spacer 18 may, e.g., comprise an insulating layer of glass, plastic, Teflon, etc., and may typically have a thickness on the order of from 0.25 mils to 5 mils.

Figure 4:
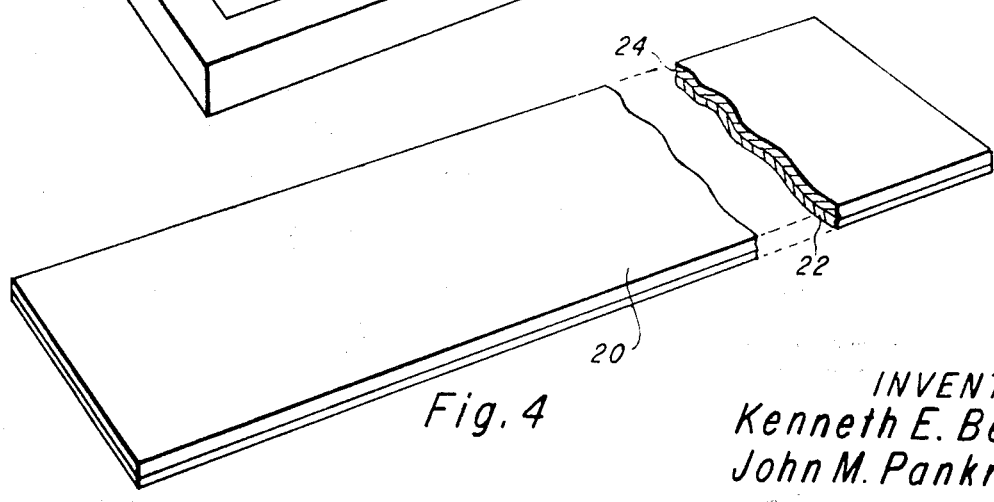
FIG. 4 is a pictorial view of a transparent electrode for use in a liquid crystal display.

FIG. 4 illustrates a transparent electrode 20 suitable for use in combination with the electrodes 12 formed in the substrate illustrated in FIG. 1 and the spacer illustrated in FIG. 3. The electrode includes two layers both of which must be relatively transparent. At least one layer of the electrode must also be electrically conductive. In the illustrated embodiment the lower layer 22 is electrically conductive while the upper layer 24 may be made of glass or other transparent and electrically nonconductive materials. Transparent and electrically conductive materials suitable for the layer 22 are well known in the art; by way of example, the layer 22 may comprise indium oxide or stannic oxide.

Figure 5:
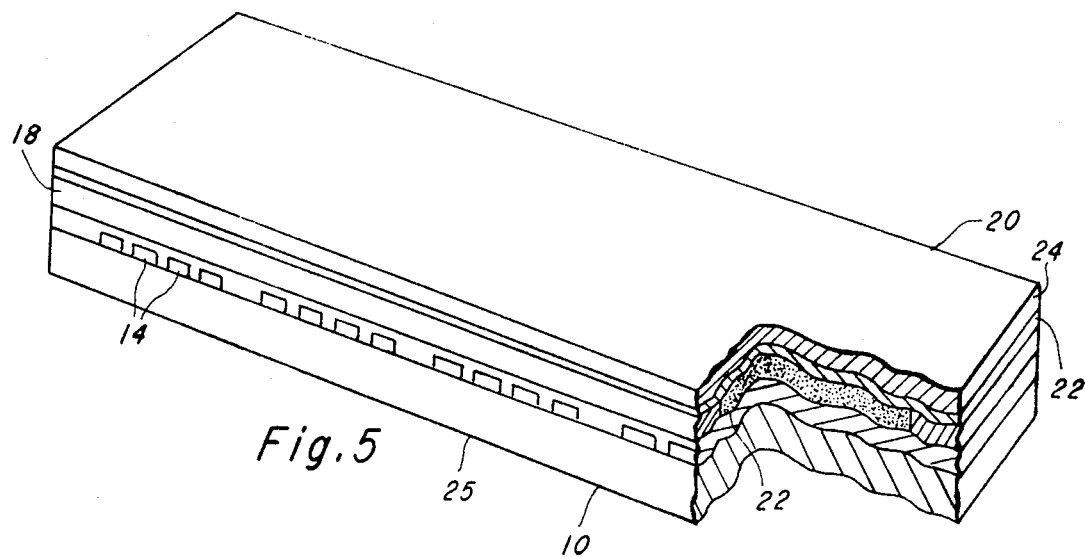
FIG. 5 is a pictorial view of a liquid crystal display device using the components illustrated in FIGS. 1–4.

FIG. 5 illustrates an embodiment of the invention which utilizes the substrate 10 of FIG. 1, the spacer 18 illustrated in FIG. 3 and the electrode 20 illustrated in FIG. 4. The display is assembled by securing the spacer 18 to the upper surface of the substrate 10 such that all of the display electrodes 12 are exposed through the central openings in the spacer 18. The electrode 20 is then secured to the spacer such that the conductive layer 22 is adjacent the spacer 18. The opening in the spacer 18 is then filled with a liquid crystal composition such that the composition electrically contacts the electrodes 12 and 20. Electrical signals may then be applied between selected ones of terminals 14 (and associated electrodes 12) and electrode 20 so that selected areas of the liquid crystal composition can be subjected to an electric field to produce "dynamic scattering" and thereby effect a display. The electrodes 12, of course, may be shaped to conform to any pattern which is desired to be displayed or some segment thereof.

Figure 6:
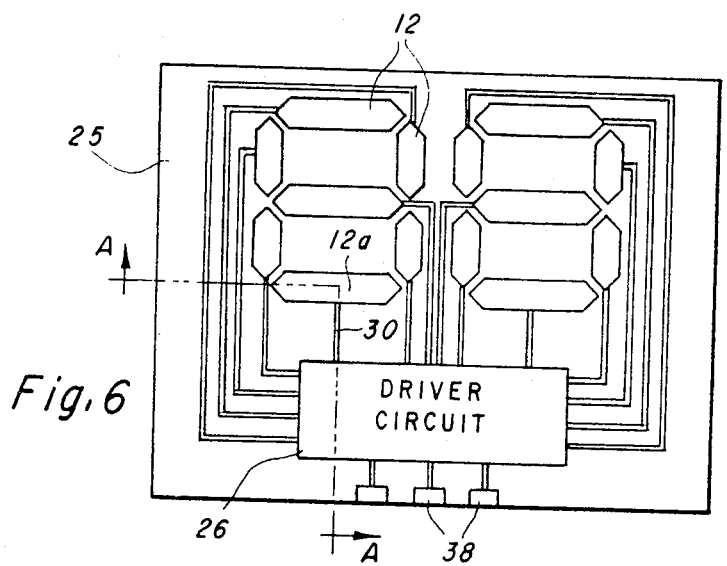
FIG. 6 is a top view of a substrate which includes electrodes for a liquid crystal display circuit and driver circuits in a common substrate.

The substrate 10 may be made of silicon or other semiconductor material such as germanium. In such a case driver circuitry and other interface circuits may be formed in the same chip in which the display terminals are formed. Such an arrangement is illustrated in FIG. 6 where a semiconductor substrate 25 has display electrodes 12 formed in one surface sufficient to display, by way of example, a two digit number. Driver circuitry 26 is integral with the substrate 25. The substrate 25 and elements thereon may be utilized to form a display similar to that illustrated in FIG. 5.

Figure 6A:
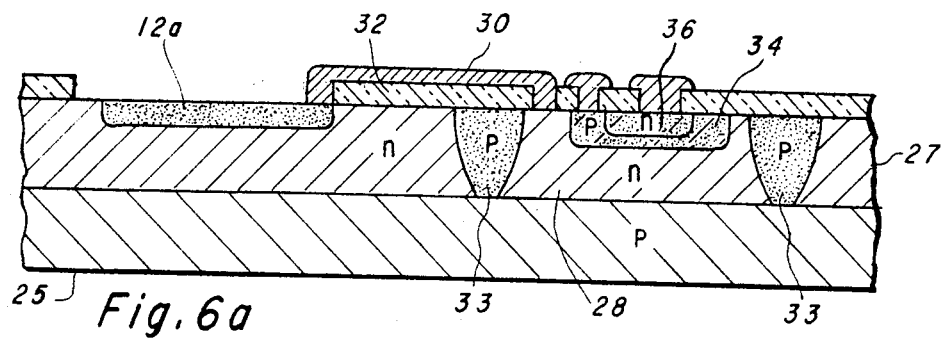
FIG. 6A is a cross-section of the substrate illustrated in FIG. 6 taken along line A—A.
Figure 22:
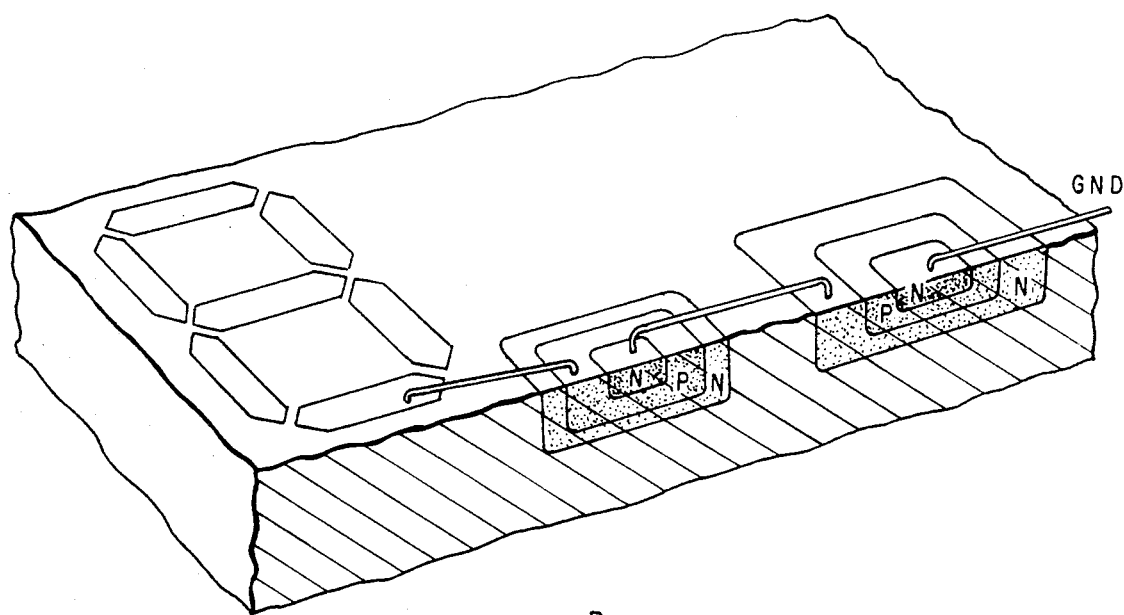
FIG. 22 illustrates a perspective view and for a liquid crystal display a schematic diagram of a driver circuit that may be used with the present invention.
Figure 22:
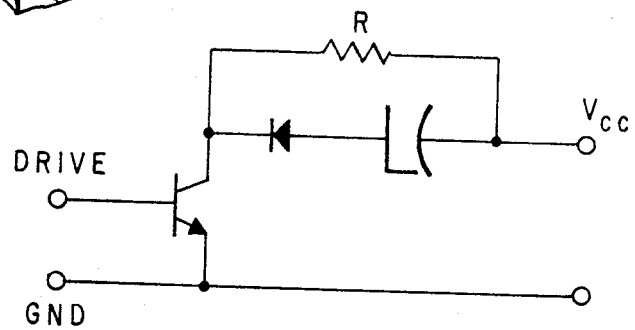

FIG. 6A is a cross-section view of the substrate 25 along line A—A. This cross-section illustrates an exemplary interconnection between one display electrode 12a and the collector 28 of a typical transistor formed integral with the same substrate. As understood by those skilled in the art, a transistor may be utilized to provide bias to the display electrode. By way of example, the circuit components of the driver circuitry, such as the aforementioned transistor, may be formed within an epitaxial layer 27 formed over the substrate 25. Generally, the epitaxial layer is of opposite conductivity type from the substrate, and may typically have a resistivity on the order of about 0.4Ω-cm. The electrode 12a is connected to the collector 28 via a thin metal layer 30 which is insulated from the layer 27 by an insulating layer 32 of silicon oxide, for example. Lateral isolation of the collector 28 from the remainder of the chip is provided by isolation rings 33 of the same conductivity type as the substrate. The transistor includes a base region 34 and an emitter region 36. The metal layer 30 which interconnects the electrode 12a with the collector 28 of the transistor may be formed utilizing standard integrated circuit metalization processes. Diffusion techniques required to make isolation rings 33 and the various regions of the transistor and interconnects are also well known in the art. While only a transistor is illustrated in FIG. 6A, it is understood that other integrated circuit elements such as resistors, diodes and capacitors can be similarly made and included in the driver circuit. A suitable driver circuit is shown in FIG. 22.

The driver circuit 26 may also include IGFET devices and other standard circuit components which may be mounted external to the substrate 25. Connection to these external components may be made via the terminal pads 38. Similar connection paths (not shown) may also be used to provide power to the display device.

Figure 7:
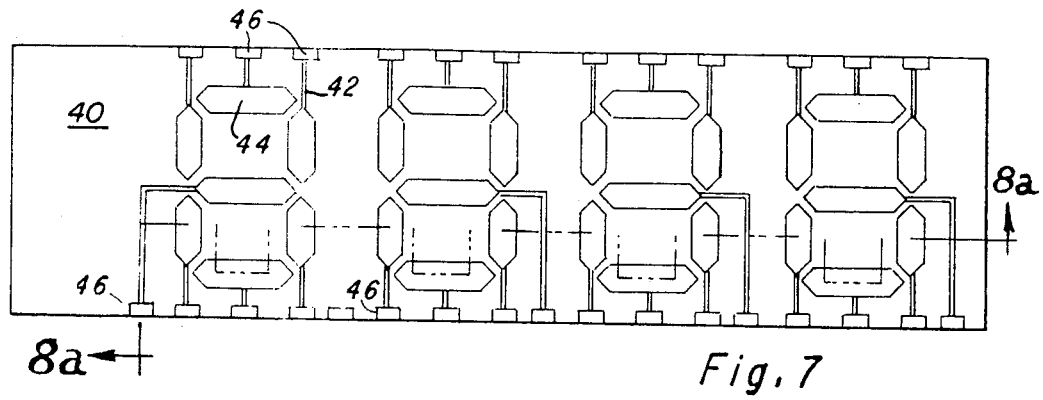
FIG. 7 is a top view of a substrate which includes electrodes and terminals for a liquid crystal display.
Figure 8:
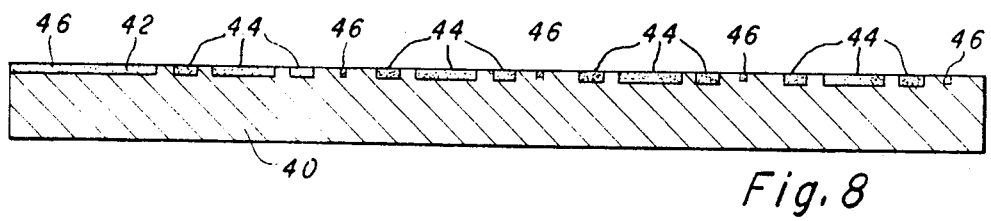
FIG. 8 is a cross-section view of the substrate of FIG. 7 taken along line 8A.
Figure 9:
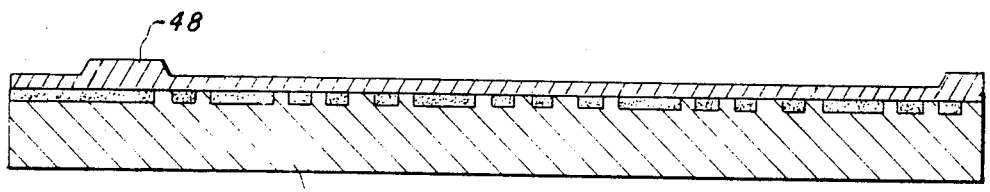
FIG. 9 is a cross-section view of the substrate of FIG. 7 illustrating subsequent process steps.
Figure 10:
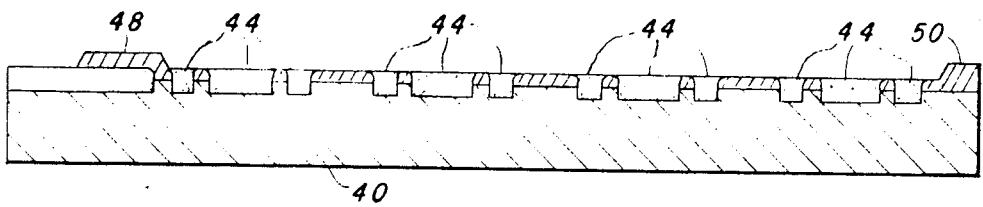
FIG. 10 is a cross-section view showing out diffusion to expose the display electrodes and terminal pads.

FIG. 7 illustrates a different embodiment of the invention utilizing a relatively high resistivity substrate 40 such that the leads 42 connecting the display electrodes 44 with terminal pads 46 are protected by an overlaying layer of insulating semiconductor material. The substrate 40 may, e.g., comprise p-type silicon having a resistivity on the order of about 10 Ω-cm or greater. A cross-section along line 8 a the substrate 40 is shown in FIG. 8. The electrodes 44, the interconnecting paths 42 and the terminal pads 46 may be formed by diffusing impurities into the substrate 40 to form low resistivity regions. After the diffused electrodes, interconnect paths and terminal pads are formed, a thin epitaxial layer 48 is deposited on the upper surface of the substrate 40. This layer may, e.g., be formed to a thickness on the order of 8 $\mu$ m. The epitaxial layer 48 is then thinned by orientation dependent etch in regions which overlie selected portions of the low resistivity regions to a thickness, for instance, of about 2 $\mu$ m. FIG. 9 illustrates the Substrate at this stage of fabrication. After selected regions of the epitaxial layer have been thinned, the substrate is heated to a temperature on the order of 1200°C for about one hour or more causing the impurities on the lower resistivity regions to out diffuse through the epitaxial layer and become exposed in the thin region of the epitaxial layer. This is illustrated in FIG. 10 wherein it may be seen that the terminal pads 46 and electrodes 44 diffuse through thin regions of the epitaxial layer 48 and thus become exposed while diffused regions underlying thick regions of the epitaxial layer remian buried thereon. The liquid crystal display is completed by securing a second electrode similar to the one illustrated in FIG. 4, for example, such that the peripheral edge of this electrode rests on the surfaces 50 of the substrate 40. The moat formed in the substrate 40 by the orientation dependent etch is filled with a liquid crystal composition which contacts both the display electrodes 44 and the transparent electrode secured to the substrate. Inasmuch as the depth of the moat or depression in the epitaxial layer may be controlled with orientation dependent etch to very accurate and uniform values, a display having improved optical characteristics may be formed.

Figure 11:
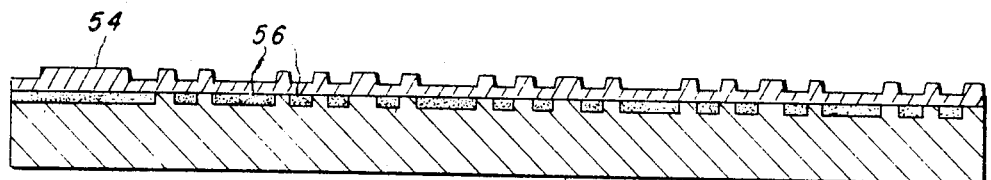
FIG. 11 is a cross-section view illustrating the addition of a thin epitaxial layer to the structure of FIG. 8 and a thinning of this layer in regions overlying the electrodes and terminal pads by orientation dependent etching.

FIG. 11 illustrates in cross-section another substrate 52 which may be used in constructing liquid crystal display devices in accordance with the present invention. The substrate 52 is similar to the substrate 40 illustrated in FIG. 10 except that the epitaxial layer 54 is thinned by orientation dependent etch only in the regions where the diffused areas 56 are desired to be exposed by out diffusion. The etched region generally conforms to the shape of the corresponding electrode.

Figure 12:
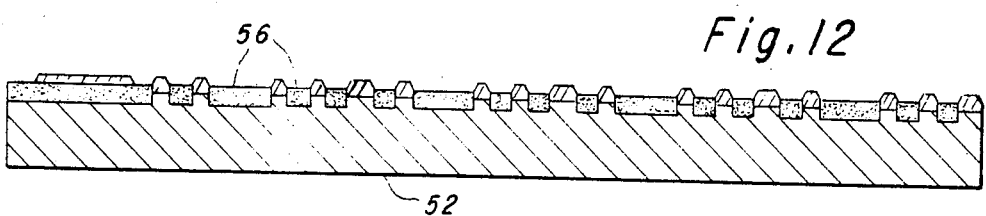
FIG. 12 is a cross-section view illustrating the structure of FIG. 11 following out diffusion so as to expose the display electrodes and the terminal pads.

A display system utilizing the substrate illustrated in FIG. 12 is completed by securing a transparent electrode such as the one illustrated in FIG. 4 on the top surface of the substrate such that the conductive layer 22 contacts the upper surface of the substrate. The depressions formed in the epitaxial layer of the orientation dependent etch are then filled with a liquid crystal composition. Since these depressions conform to the electrode pattern there may be more than one cavity which will be required to be filled. However, in all cases the liquid crystal composition contacts at least one of the electrodes 56 and the conductive layer 22 of the transparent electrode.

The structures illustrated in FIGS. 10 and 12 may also include integral driving circuitry similar to the embodiment illustrated in FIG. 6. The regions of the substrate forming the elements of the driver circuitry may be interconnected with the electrodes using conventional integrated circuit metalization techniques or they may be interconnected by buried diffusion paths underlying epitaxial layers on the substrate. The driver circuit may also be positioned on the opposite side of the slice from the electrodes and interconnected to the electrodes by conductive regions through the substrate. A portion of a slice showing one display electrode interconnected with a transistor by a low resistivity layer beneath an insulating type epitaxial layer is illustrated in cross-section in FIG. 13. A portion of a substrate including a display electrode and a driver circuit positioned on the opposite side of the substrate from the electrode and interconnected to the electrode by a low resistance connection through the slice is illustrated in cross-section in FIG. 14.

Figure 13:
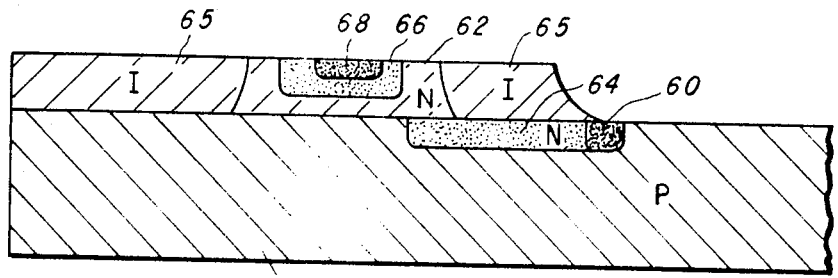
FIG. 13 is a cross-section view illustrating interconnections of a typical electrode with a transistor forming a part of the driver circuit by buried diffused layers.

With reference now to FIG. 13, a partial cross-section of the substrate 58 includes a display electrode 60 connected to the collector 62 of a transistor by a buried conductor region 64. By way of example, an NPN transistor is described; a PNP device could also be formed. The transistor also includes a base region 66 and an emitter region 68. The conductive region 64 is covered by a portion of an insulating epitaxial layer 65. The base region 66 and the emitter region 68 of the transistor may be interconnected with other circuit components formed within the epitaxial layer 65 to form the completed driver circuit. Additional electrodes similar to the one electrode 60 illustrated may be also included within the substrate 58 and similarly interconnected to circuit components formed within the epitaxial layer 65 to form the completed display unit and integral driver circuitry. The epitaxial layer 65 is removed in regions overlying the display electrode 60 by orientation dependent etch producing a moat whose depth may be very accurately controlled. The display is completed by positioning a transparent electrode similar to the one illustrated in FIG. 4 such that the outer edges of the electrode rests on the epitaxial layer 65 and completely cover the moat. The electrode is then secured to the substrate 58 and the moat is filled with a liquid crystal composition which contacts the display electrodes 60 and the conductive surface of the transparent electrode. Energizing the driver circuit will cause the liquid crystal composition positioned between the electrodes to be subjected to an electrical field and cause the light transmitting characteristics of the composition in the biased regions to change, thereby displaying the desired pattern as previously discussed with reference to other embodiments.

Figure 14:
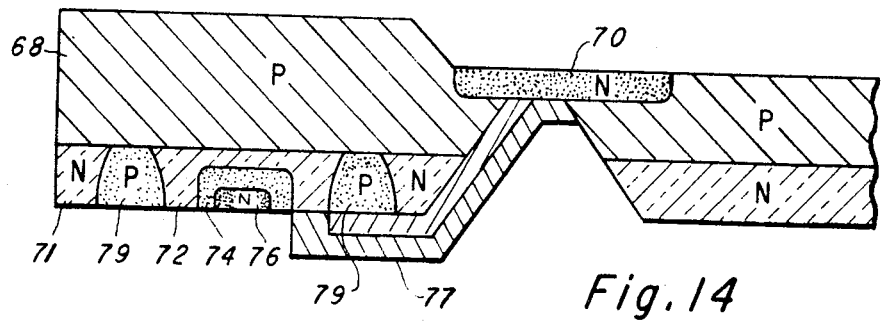
FIG. 14 is a partial cross-section of a substrate which includes a display electrode illustrating how the electrode can be interconnected with a typical transistor forming a part of the driver circuit by exposing the back portion of the electrode by orientation dependent etch.

A partial cross-section view of another substrate including integral driver circuitry is illustrated in FIG. 14. A substrate 68 includes a display electrode 70 positioned within a moat formed in one surface of the substrate 68, and a portion of a driver circuit formed within an epitaxial layer 71 on the back surface of the substrate. A typical transistor having a collector region 72, a base region 74 and an emitter region 76 is shown in cross-section with the collector region 72 interconnected with the electrode 70 by a thin conductive layer 77. The transistor is isolated from the remainder of the chip by isolation diffusing rings 79. The base and emitter regions of the transistors may be similarly connected to other circuit components formed within the epitaxial layer 71 to complete the driver circuit. A liquid crystal display utilizing the substrate 68 is completed by positioning a transparent electrode similar to the electrode illustrated in FIG. 4 such that the electrode covers the moat in the upper surface of the substrate 68. Energizing the driver circuit then subjects the liquid crystal composition positioned between the transparent electrode and the electrode 70 to an electric field causing the light transmitting characteristics of the liquid crystal composition to selectively change and thereby generate the pattern which is desired to be displayed.

Figure 15:
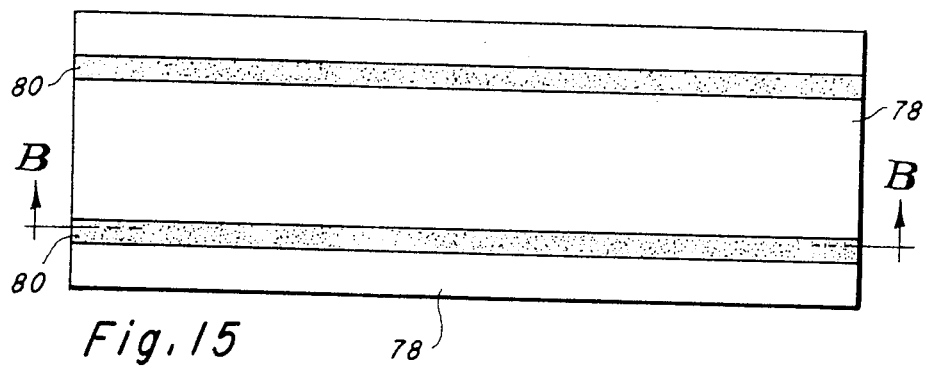
FIG. 15 is a top view of a substrate having two diffused conductive paths formed therein.
Figure 16:
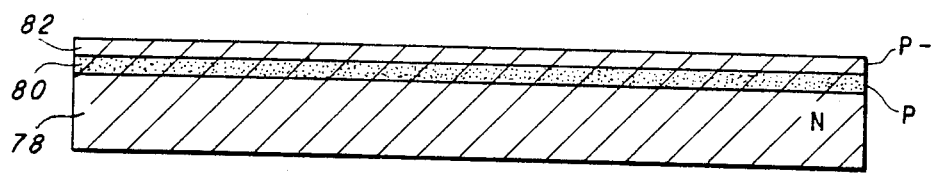
FIG. 16 is a cross-section view of the substrate of FIG. 15 taken along line B—B and includes an additional epitaxial layer.

FIG. 15 illustrates another semiconductor substrate in which two conductive regions 80 have been formed by diffusion of impurities into the substrate 78. FIG. 16 illustrates a cross-section taken along line B—B of FIG. 15, illustrating an epitaxial layer 82 formed on the substrate and overlying the conductive regions 80.

Figure 17:
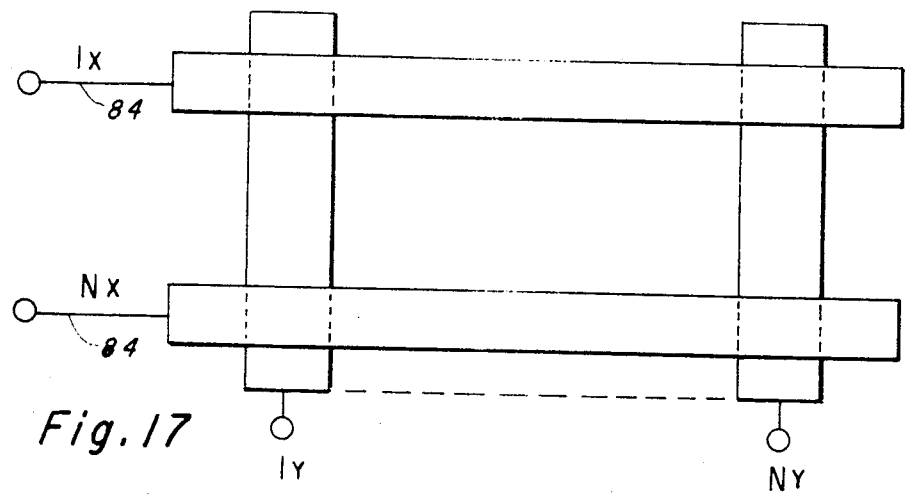
FIG. 17 is a pictorial view of a substrate suitable for use in dot type liquid crystal display devices and includes a diode in series with each of the display elements.
Figure 18:
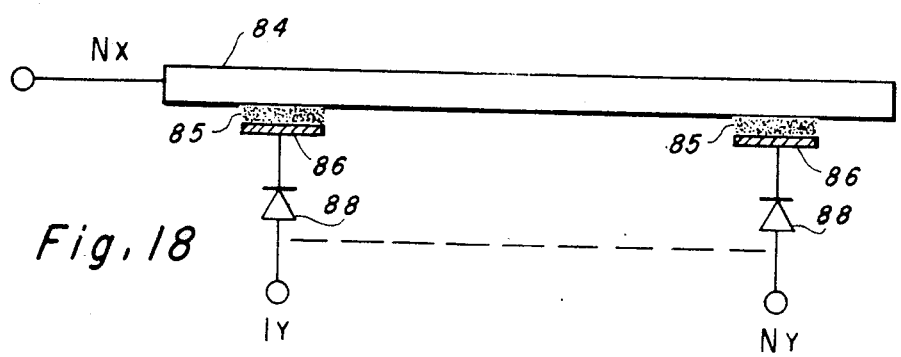
FIG. 18 illustrates schematically the system for forming a dot type liquid crystal display system by using X-Y addressing.
Figure 19:
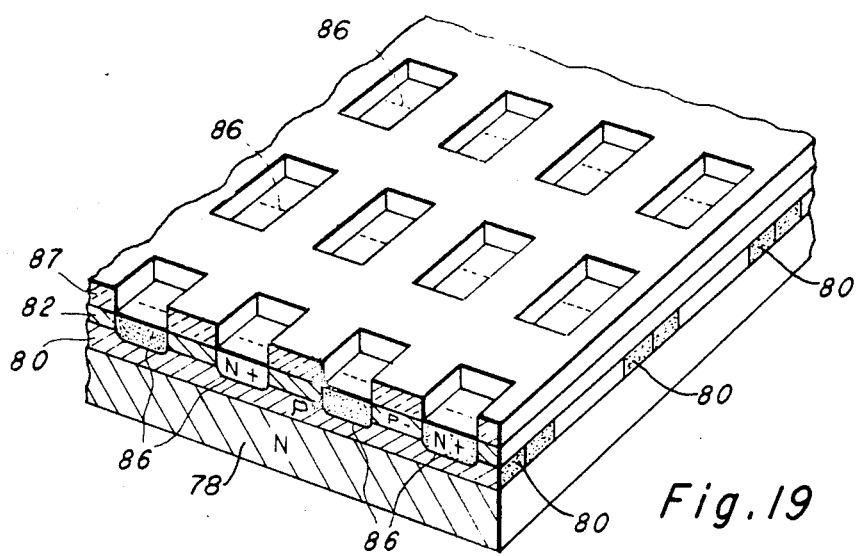
FIG. 19 illustrates schematically the equivalent circuit of each element of a dot type liquid crystal display in which each element includes a diode in series therewith.

In liquid crystal displays using matrix addressing to generate a dot type display wherein the character to be displayed is defined by a series of dots which are placed at positions conforming to the outline of the desired pattern, it is desirable to place a diode in series with each of the display elements in order that the matrix may be addressed in the so-called scan mode. The embodiments illustrated in FIGS. 15 and 16 are particularly useful in forming this type of display device. A first set of electrodes are formed in one surface of the substrate in a series of relatively thin and parallel positioned conductors; the conductive layer (such as layer 22, FIG. 4) on the transparent electrode is similarly divided into relatively narrow and parallel conductive strips to define a second set of electrodes. The transparent electrode is oriented with respect to the substrate such that the two patterns of parallel conductors are orthogonal with respect to each other, the intersection points of respective electrodes of the two sets defining a matrix of points or dots. Approximately one-half of the voltages required to cause the light transmitting characteristics of the liquid crystal composition to change is then applied on selected elements of each of the two sets of orthogonal conductors. The crossing points of those elements which are energized bias the liquid crystal composition therebetween and cause dynamic scattering, thereby displaying a dot. This technique is shown schematically in FIG. 17 with the conductors designated by a subscript y corresponding to a conductor region 80 illustrated in FIG. 15 and the conductors 84 designated by a subscript x being the conductive set formed on the transparent electrode. Addressable display points or dots, respectively including a series diode, are illustrated in FIG. 18 wherein conductor 84 corresponds to one of the elements from the transparent electrode and an end view of respective conductors formed in ths substrate is shown at 86. The individual display points are shown generally at 85 wherein the speckled area represents a liquid crystal composition. Diodes 88 are connected in series with each of the display or dot elements. A substrate including these series diodes is illustrated pictorially in FIG. 19. The structure illustrated in FIG. 16 may be used as the starting material, and includes a diffused conductive region 80 overlying the substrate 78, and a relatively high resistivity epitaxial layer 82 overlying the region 80. By way of example, the substrate may be n-type silicon, the region 80 p-type and the epitaxial layer 82 p-type. The layer 82 may typically be formed to have a thickness on the order of 5 $\mu$m and a resistivity of about 10 $\Omega$-cm. A thin insulating layer 87, such as silicon oxide, is formed to overlie the epitaxial layer 82. Windows are then opened in the silicon oxide layer 87 and a diffusion is made in the epitaxial layer 82 and into the conductive regions 80, and are of opposite conductivity type therefrom. By making the epitaxial layer essentially insulative, the diodes 88 (FIG. 18) are isolated from each other by the high resistance of the epitaxial layer. The junctions formed between the diffused regions 86 and the conductive layers 80 form a series of diodes having one terminal connected into a typical conductor 80. The second terminal of these diodes is exposed along the upper surface of the substrate 78. A transparent electrode having a set or parallel conductive stripes is then placed substantially parallel to the upper surface of the substrate 78 such that respective strips are orthogonal to electrodes 80. The area between the transparent electrode and the substrate 78 is filled with a liquid crystal composition which contacts both the exposed terminals of each of the diodes formed by diffused regions 86 and the conductive strips on the transparent electrode. By selectively energizing the conductor regions 80 and the conductive strips on the transparent electrode, the liquid crystal composition can be addressed in the so-called x–y scan mode with each of the display elements having an isolated and individual diode in series with the display elements (FIG. 18).

The oxide layer 87 may be retained after the diffusion step, the windows forming pockets for the liquid crystal composition. Alternatively, the layer 87 may be removed and a suitable spacer utilized to contain the liquid crystal composition so that it overlies the respective display points and electrically contacts conductors 80. Also, a moat may be formed in the epitaxial layer 82 by orientation dependent etch to provide the proper spacing between the electrodes and to contain the liquid crystal composition.

Figure 20:
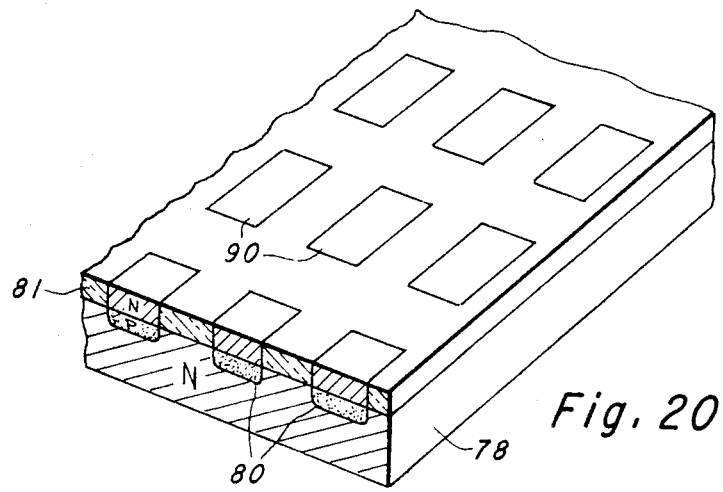
FIG. 20 is a second substrate suitable for use in a dot type display system and includes a diode in series with each of the display elements.

A portion of a second substrate structure useful in liquid crystal displays with x–y addressing and having individual diodes connected in series with each of the dot elements is illustrated in FIG. 20. This embodiment utilizes the substrate 78 illustrated in FIG. 15 and 16. A substrate 78 having conductive regions 80 (reference FIG. 15) extending to one surface is covered with a thin insulating layer 81 such as silicon oxide and windows 90 are opened therein. The windows 90 are then filled by epitaxially growing silicon of opposite conductivity type from the silicon forming the conductor regions 80. The junctions between these two regions form a diode which is in series with each of the addressable dots. The liquid crystal display is completed in a manner similar to that described with reference to FIG. 19.

Figure 21A:
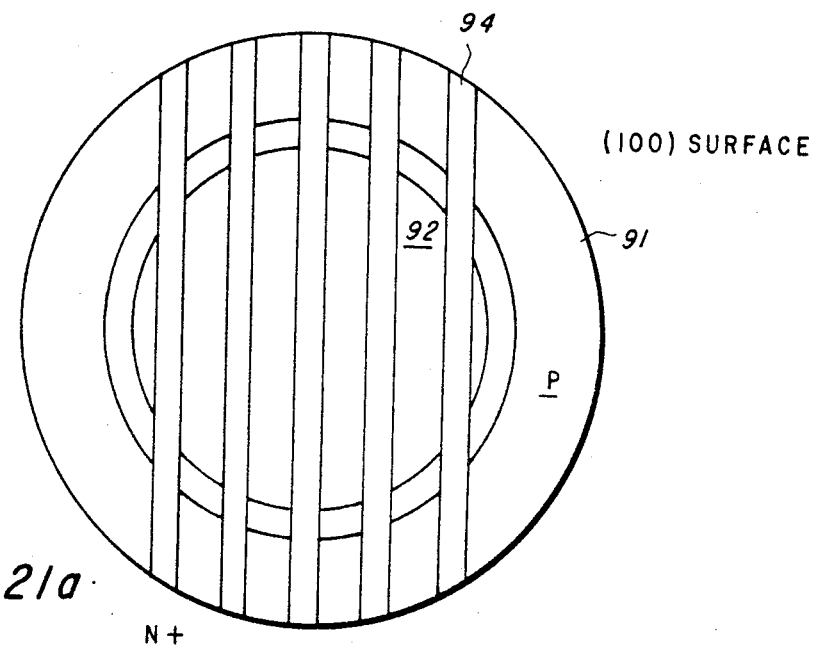
Figure 21B:
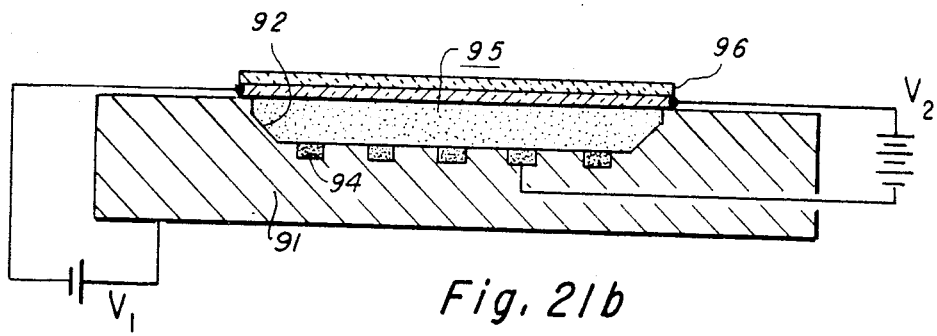

With reference to FIGS. 21a and 21b there is illustrated a liquid crystal display fabricated in accordance with the present invention. A p-type silicon substrate 90 was used as a starting material. The substrate 90 had a resistivity in the range of 20 to 50 $\Omega$-cm. A moat 92 was etched in the (100) face of the substrate to a depth of about 18 microns, using orientation dependent etch. N$^+$ strips 94 were deposited in the moat using conventional mask and diffusion techniques. These N$^+$0 strips formed respective selectable electrodes of the display. A second transparent electrode 96 was positioned over the moat. This electrode comprised a layer of glass having a conductive layer comprising tin oxide formed on one surface. The tin oxide formed a second electrode of the display. The moat was filled with a nematic liquid crystal composition comprising 40% 4'-methoxybenzylidene-4-butylaniline and 60% 4'-ethoxybenzylidene-4-butylaniline. The mixture had from 1 to 2 percent conductivity affecting impurities included in it, such that it responded to d.c. voltages on the order of 7 to 20 volts. A four and one-half volt d.c. source $V_1$ was connected between the tin oxide layer of the electrode 96 and the substrate 90. The source $V_1$ was connected to reverse bias the p-n junction between the substrate 90 and the N$^+$ regions 94. A 22½ d.c. voltage source $V_2$ was connected between the tin oxide electrode and respective ones of the N$^+$ diffused electrodes. Upon application of the voltage source $V_2$ the liquid crystal composition 95 scattered light in the region between the energized electrode 94 and the tin oxide electrode.

Although the invention has been described and defined in detail with reference to specific embodiments it will be obvious to those skilled in the art that many changes may be made all of which will be within the scope of the invention as described and defined herein.

What is claimed is:

1. A liquid crystal display device comprising in combination:

a. a high resistivity substrate having a depression formed therein defining a moat;
   b. a pattern of electrically conductive electrodes positioned within said moat;

c. a substantially transparent electrode covering said moat;

d. a liquid crystal composition capable of scattering light in response to an electric field substantially filling said moat and electrically contacting said pattern of electrically conductive electrodes and said transparent electrode; and e. means for selectively applying bias voltage between said transparent electrode and respective ones of said pattern of electrodes to change the optical transmissivity of the liquid crystal composition therebetween.

2. A liquid crystal display device in accordance with claim 1, in which said substrate is substantially transparent.

3. A liquid crystal display pattern system comprising in combination:

a. a relatively high resistivity semiconductor substrate having a depression formed in a first region the rein defining a moat in said first region;

b. a first pattern of electrically conductive areas within said substrate, selected ones of said areas extending to the surface of said substrate within said first region;

c. a substantially transparent electrode covering said moat;

d. a liquid crystal composition capable of scattering light in response to an electric field substantially filling said moat and electrically contacting said selected ones of said first pattern of electrically conductive areas and said substantially transparent electrode;

e. circuit means for selectively applying an electric field across said liquid crystal composition formed within a second region of said substrate; and f. a second pattern of electrically conductive areas witin said substrate selectively interconnecting said first pattern of electrically conductive areas with said circuit means.

4. A liquid crystal display system in accordance with claim 3, wherein selected regions of said substrate and said second pattern of electrically conductive areas are transparent.

5. A liquid crystal display system comprising in combination:

a. a composite substrate including first and second substrates;

b. said first substrate having a depression formed in a surface thereof defining a moat, and a first pattern of electrically conductive regions disposed in said moat to define first electrodes;

c. said second substrate having a second pattern of electrically conductive regions therein to define second electrodes;

d. said first and second substrates being secured together such that said second substrate substantially covers said moat with said first and second patterns of electrically conductive regions being positioned substantially parallel to each other in spaced apart relationship; and e. a liquid crystal composition capable of scattering light in response to an electric field substantially filling said moat and electrically contacting said first and second patterns of electrically conductive regions.

6. A liquid crystal display system in accordance with claim 5, wherein said first substrate is silicon.

7. A liquid crystal display system in accordance with claim 6 wherein said moat is etched into the (100) face of said silicon substrate.

8. A liquid crystal display system in accordance with claim 6 wherein said moat is etched into the surface of said silicon substrate by orientation dependent etching to provide accurate control of the dimensions of said moat.

9. A liquid crystal display system in accordance with claim 8 in which said first substrate is (100) oriented silicon.

10. A liquid crystal display system in accordance with claim 8 in which said first substrate is (110) oriented silicon.

11. A liquid crystal display system in accordance with claim 8 in which said first substrate is (111) oriented silicon.

12. A liquid crystal display device, comprising in combination:

a. a semiconductor substrate including a pattern of first electrodes, said first electrodes being positioned in a moat etched into the surface of said substrate;

b. a second electrode positioned substantially parallel to and spaced from said pattern of first electrodes; and c. a liquid crystal composition capable of scattering light in response to an electric field substantially filling said moat and being positioned between and in contact with said first and second electrodes.

13. A liquid crystal display device, comprising in combination:

a. a semiconductor substrate having therein a pattern of first electrodes, a display driver circuit and a pattern of low resistivity regions, said low resistivity regions connecting said pattern of first electrodes with said driver circuit, b. a second electrode spaced from and substantially parallel to said pattern of first electrodes, and c. a liquid crystal composition capable of scattering light in response to an electric field, said liquid crystal composition being positioned between and in contact with said first and second electrodes.

14. A liquid crystal display device in accordance with claim 13 wherein said first and second electrodes are held in spaced relationship with respect to each other by a thin insulating layer, said insulating layer having at least one opening therein in which said liquid crystal composition is positioned.

15. A liquid crystal display device, comprising in combination:

a. a semiconductor substrate having therein a pattern of first electrodes;

b. at least a second electrode positioned substantially parallel to and spaced from said pattern of first electrodes; and c. a liquid crystal composition positioned between said first and second electrodes such that the optical characteristics of said liquid crystal can be altered by the application of an electrical potential between selected ones of said electrodes.

16. A liquid crystal display device comprising in combination:

a. a semiconductor substrate having first conductive regions formed in a first surface thereof by selective doping of said substrate to define a pattern of first electrodes and second conductive regions formed in a second surface thereof, said second regions extending through said substrate to selectively contact said first regions;

b. a transparent electrode positioned from and substantially parallel to said first surface of said substrate; and c. a liquid crystal composition capable of scattering light in response to an electric field, said liquid crystal composition being positioned between and in electrical contact with said pattern of first electrodes and said transparent electrode.

17. A liquid crystal display device as set forth in claim 16 including a layer of highly reflective metal disposed over said first conductive regions of said semiconductor substrate.

18. A liquid crystal display device comprising in combination:

a. a semiconductor substrate including a pattern of first electrodes;

b. a second electrode positioned substantially parallel to and spaced from said pattern of first electrodes; and c. a liquid crystal composition capable of scattering light in response to an electric field, said liquid crystal composition being positioned between and in contact with said first and second electrodes.

19. A liquid crystal display device in accordance with claim 18 wherein said first and second electrodes are held in spaced relationship with respect to each other by a thin insulating layer, said insulating layer having at least one opening therein in which said liquid crystal composition is positioned.

20. A liquid crystal display device comprising:

a. a high resistivity semiconductor substrate having a depression formed in one surface thereof defining a moat;

b. a pattern of electrically conductive regions formed in said substrate and positioned to lie within said moat, said pattern of electrically conductive regions defining first electrodes having exposed surfaces at the bottom of said moat;

c. a display driver circuit including at least one active semiconductor component formed in said one surface of said substrate and disposed outwardly with respect to said moat;

d. at least one low resistivity electrically conductive region buried within said substrate and extending between said pattern of first electrodes and said active semiconductor component included in said display driver circuit to connect said pattern of first electrodes with said display driver circuit;

e. a second electrode mounted on said one surface of said substrate in spaced substantially parallel relation to said pattern of first electrodes, said second electrode being transparent and covering said moat; and f. a liquid crystal composition capable of scattering light in response to an electric field substantially filling said moat and electrically contacting said pattern of first electrodes and said second electrode.

21. A liquid crystal display device comprising:

a. a high resistivity semiconductor substrate having a depression formed in one surface thereof to define a moat therein;

b. a pattern of electrically conductive regions formed in said substrate and positioned to lie within said moat, said pattern of electrically conductive regions defining first electrodes having exposed surfaces at the bottom of said moat;

c. a display driver circuit including at least one active semiconductor component formed in the surface of said substrate opposite from that in which said moat-defining depression is formed;

d. at least one electrically conductive lead disposed on said opposite surface of said substrate and having its opposite ends respectively connected to one electrode of said pattern of first electrodes and said active semiconductor component for interconnecting said pattern of first electrodes with said display driver circuit;

e. a second electrode mounted on said one surface of said substrate in spaced substantially parallel relation to said pattern of first electrodes, said second electrode being transparent and covering said moat; and f. a liquid crystal composition capable of scattering light in response to an electric field substantially filling said moat and electrically contacting said pattern of first electrodes and said second electrode.

22. A liquid crystal display device comprising:

a. a high resistivity semiconductor substrate;

b. a first pattern of electrically conductive elongated areas of one conductivity type semiconductor material within said substrate and extending to the surface thereof in spaced parallel relationship with respect to each other;

c. an insulating layer disposed on said surface of said substrate and covering said first pattern of electrically conductive elongated areas;

d. said insulating layer being provided with a plurality of openings therethrough exposing portions of the electrically conductive areas of said first pattern therebelow, the openings being arranged in rows and columns;

e. a plurality of regions of semiconductor material of opposite conductivity type from that of the semiconductor material forming said first pattern of electrically conductive elongated areas, said plurality of regions intersecting with said electrically conductive elongated areas of said first pattern and being respectively located in registration with the openings provided in said insulating layer to form the bottom walls thereof, said plurality of regions cooperating with said first pattern of electrically conductive elongated areas to define respective p-n junctions between each of said regions and the portion of the electrically conductive elongated area of said first pattern intersecting therewith;

f. a transparent member mounted on said insulating layer and having a second pattern of electrically conductive elongated areas arranged in spaced parallel relationship with respect to each other and opposed to said electrically conductive elongated areas of said first pattern in spaced substantially parallel relation thereto;

g. said first and second patterns of electrically conductive elongated areas being orthogonally related with respect to each other; and h. a liquid crystal composition capable of scattering light in response to an electric field substantially filling each of said openings in said insulating layer and electrically contacting said plurality of regions forming the bottom walls of said openings and said second pattern of electrically conductive elongated areas.

23. A liquid crystal display device comprising:
a. a high resistivity semiconductor substrate;
b. a first pattern of electrically conductive elongated areas of one conductivity type semiconductor material within said substrate and extending to the surface thereof in spaced parallel relationship with respect to each other;
c. an insulating layer disposed on said surface of said substrate and covering said first pattern of electrically conductive elongated areas;
d. said insulating layer being provided with a plurality of openings therethrough exposing portions of the electrically conductive areas of said first pattern therebelow, the openings being arranged in rows and columns;
e. respective plugs of semiconductor material received in and filling the openings in said insulating layer, said plugs being of semiconductor material of opposite conductivity type from that of the semiconductor material forming said first pattern of electrically conductive elongated areas to define respective p-n junctions between each of said plugs and the portion of the electrically conductive elongated area of said first pattern contacted thereby;
f. a transparent member mounted above said substrate in spaced relation to said plugs, said transparent member having a second pattern of electrically conductive elongated areas arranged in spaced parallel relationship with respect to each other and opposed to said electrically conductive elongated areas of said first pattern in spaced substantially parallel relation thereto;
g. said first and second patterns of electrically conductive elongated areas being orthogonally related with respect to each other; and
h. a liquid crystal composition capable of scattering light in response to an electric field, said liquid crystal composition being positioned between and in electrical contact with said plugs and said second pattern of electrically conductive elongated areas.

* * * * *